R. P. THOMPSON.
PORTABLE DRILL, KNOWN AS HAND OR BREAST DRILL.
APPLICATION FILED JUNE 12, 1911.

1,034,535.　　　　　　　　　　　Patented Aug. 6, 1912.

WITNESSES:
Harvey J. Warrick.
Christian Baldenhofer.

Ralph P. Thompson　INVENTOR.

COLUMBIA PLANOGRAPH CO., WASHINGTON, D. C.

UNITED STATES PATENT OFFICE.

RALPH P. THOMPSON, OF SPRINGFIELD, OHIO.

PORTABLE DRILL, KNOWN AS HAND OR BREAST DRILL.

1,034,535.  Specification of Letters Patent. Patented Aug. 6, 1912.

Application filed June 12, 1911. Serial No. 632,605.

*To all whom it may concern:*

Be it known that I, RALPH P. THOMPSON, a citizen of the United States, residing at Springfield, county of Clark, and State of Ohio, have invented certain new and useful Improvements in Portable Drills, Known as Hand or Breast Drills, of which the following is a specification.

The object of my invention is two-fold, the first purpose being to provide a means of locking the spindle, so that it may not turn under the torsional strain that is put upon it during the act of tightening the drill bit in the chuck, and the second purpose being to effect, as a result of the locking movement, a new relative position of the parts that will cause the force exerted in tightening the drill chuck to react directly upon the supporting surface when the drill is rested thereon in a natural upright position, thus making it possible to effectively tighten the drill bit in the drill chuck with the least possible expenditure of manual effort. I accomplish these objects by combining in the main frame of the drill two structural members which have a movement one upon the other. One frame member is adapted to carry the spindle and chuck, and by its movement upon the other frame member, it is adapted to bring the spindle into locking contact with a locking device and when so locked, the spindle is prevented from turning. At the same time that the spindle is brought into locking position, the chuck is thrown into a position that enables the operator to gain the greatest purchase for the act of chucking the drill bit.

Figure 1:
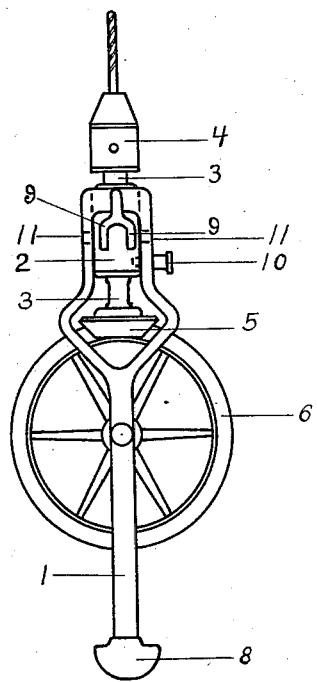
Figure 2:
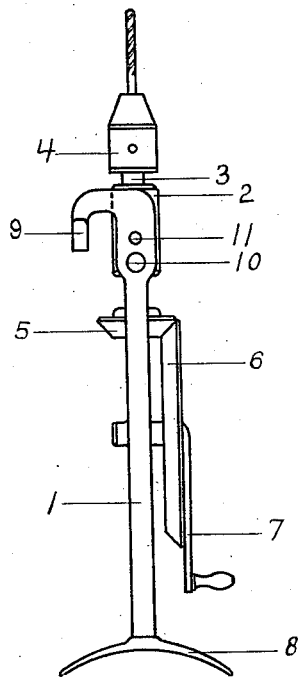
Figure 3:
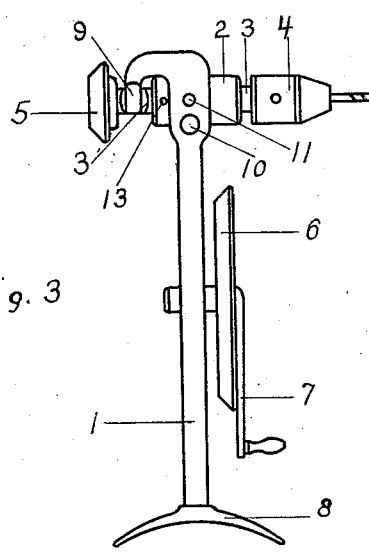
Figure 4:
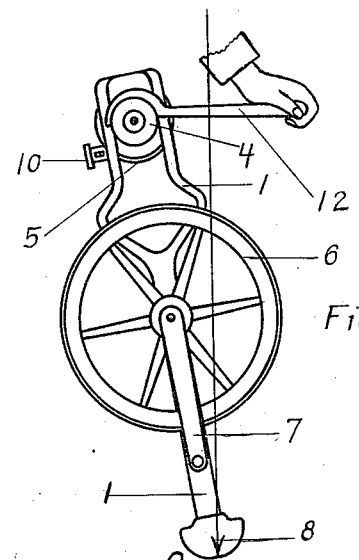

In the accompanying drawings, which form a part of this specification, Figure 1 is a plan view, Fig. 2 is side view, Fig. 3 is the same as Fig. 2 with the spindle in locking position, while Fig. 4 is a plan view, showing the side opposite to that shown in Fig. 1, and also having the operator's hand shown in the act of using pressure on the chuck wrench, the main direction of the force thereof, being indicated by a line and arrow.

The various members are designated by numbers as follows:

1 is the major member of the main frame, upon which a suitable bearing for the driving gear 6 is mounted. The driving gear 6 is hand driven by means of a crank arm 7 shown with knob attached. The minor member of the drill frame 2 is pivotally attached to the major member by means of trunnions shown in Figs. 2 and 3 at 11.

The minor member 2 carries the drill spindle 3 to one end of which is attached the bevel pinion 5, and to the opposite end of which the chuck 4 is attached. Normally, member 2 is held in alinement upon member 1 by the trunnions 11 and the button headed pin 10 which slides in a barrel projecting from the side of the major member. This pin engages in a hole in the minor member shown at 13, Fig. 3. The drill spindle 3 which turns in bearings in member 2 has flattened sides for a part of its exposed length, the thickness of the spindle across the flats being of the proper dimension to fit easily between the jaws 9 and 9, Fig. 1.

The method of operation of chucking the drill is as follows: Assuming that the drill has been in use member 2 in normal driving position as shown in Figs. 1 and 2, the first act of the operator is to withdraw the locking pin by pulling it out of engagement with member 2, using the knurled head 10 as a convenient means for grasping with the thumb and finger. Member 2 will now be free to tilt on the trunnions 11, Figs. 1 and 2, and the motion will continue until the flattened sides of the spindle shown at 3 Fig. 1, pass between the jaws 9 and 9.

The side view of Fig. 3 shows the relative position of parts when in locking position. In passing from normal to locking position the pinion 5 is first freed from the gear 6 after which time the spindle may turn until it drops into the jaws 9 and 9. When in locking position as shown in Fig. 3, a chuck wrench 12 may be applied to the chuck and the drill loosened readily by setting the drill upright on a bench or other convenient place and giving the wrench a thrust or a light blow with the palm of the hand, see Fig. 4. In like manner the drill may be replaced and tightened in the chuck, except of course that the chuck is then turned in the opposite direction.

In Fig. 4 the main direction of the blow or thrust of the hand is indicated by the line and arrow. The slight tilting of the drill will balance the force used upon the chuck in such a manner that only the force actually necessary to properly lock the drill in the chuck will be needed. This feature of being able to balance the drill so that but a straight thrust is all that is required to tighten the chuck, reduces to the minimum the manual labor. In all other hand drills the chucking operation requires the combined efforts of both hands, as with one hand it is always necessary to hold the gear of the chuck from turning while the other hand is used to tighten the chuck. With my invention the jaws 9 and 9 prevent all turning of the spindle leaving the hands free to manipulate the chuck. In addition to this advantage the throwing of the spindle out of axial line puts the mechanism in a shape that braces against the force of the chucking operation and greatly facilitates handling.

The form in which the invention is shown represents a simple and efficient construction, but I do not confine my invention to the form shown as many forms can be devised for using the same combination of elements. I therefore desire to secure Letters Patent on the invention as covered by the following claims:

1. In a portable hand drill, the combination of a main frame carrying thereon the driving mechanism for driving the drill spindle, a drill spindle having for a part of its exposed length a non-circular section, a portion of the main frame so shaped that it is adapted to fit and hold the non-circular portion of the drill spindle for the purpose of preventing its turning during the act of tightening the drill bit in the drill chuck, a bearing member carrying bearings for the drill spindle and jointed to the main frame by trunnions which permit of a rocking motion to the said bearing member, the said rocking movement in one direction being adapted to cause the non-circular portion of the spindle to be brought into locking engagement with the said holding portion of the main frame, and the opposite movement of the bearing member being adapted to restore the bearing member to normal position wherein the spindle engages with the driving mechanism.

2. The combination in portable drill having a frame structure composed of two members which have a correlating movement one upon the other, of a pressure receiving surface on one of said members adapted to receive the pressure which acts to force the drill bit into the work, a drill spindle carried by the companion member of said frame structure, the said companion member by virtue of its correlating movement upon the other member of the frame structure being adapted to bring the drill spindle into two positions, one of normal or driving position and the other in which the drill spindle is brought into locking engagement with a locking device for preventing the spindle from turning and also for the purpose of causing the line of force created by the act of chucking the drill bit to fall within the area of the said pressure receiving surface when said surface is in contact with a resisting medium.

RALPH P. THOMPSON.

Witnesses:
HARVEY J. WARRICK,
CHRISTIAN BALDENHOFER.

---

Copies of this patent may be obtained for five cents each, by addressing the "Commissioner of Patents, Washington, D. C."